US010244211B2

(12) United States Patent
Smolyanskiy et al.

(10) Patent No.: US 10,244,211 B2
(45) Date of Patent: Mar. 26, 2019

(54) IMMERSIVE INTERACTIVE TELEPRESENCE

(71) Applicant: Microsoft Technology Licensing, LLC, Redmond, WA (US)

(72) Inventors: Nikolai Smolyanskiy, Seattle, WA (US); Zhengyou Zhang, Bellevue, WA (US); Vikram R. Dendi, Redmond, WA (US); Michael Hall, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 15/056,983

(22) Filed: Feb. 29, 2016

(65) Prior Publication Data

US 2017/0251181 A1 Aug. 31, 2017

(51) Int. Cl.
*H04N 7/18* (2006.01)
*H04L 29/06* (2006.01)
(Continued)

(52) U.S. Cl.
CPC ........... *H04N 7/185* (2013.01); *B64C 39/024* (2013.01); *G01C 21/3484* (2013.01); *G05D 1/005* (2013.01); *G05D 1/0016* (2013.01); *G05D 1/0038* (2013.01); *G08G 5/006* (2013.01); *G08G 5/0026* (2013.01); *G08G 5/0034* (2013.01); *G08G 5/0039* (2013.01); *G08G 5/0069* (2013.01); *G08G 5/0082* (2013.01); *H04L 67/38* (2013.01); *B64C 2201/127* (2013.01); *B64C 2201/141* (2013.01); *B64C 2201/146* (2013.01)

(58) Field of Classification Search
CPC ............ B64C 39/024; B64C 2201/141; B64C 2201/127; G05D 1/0011; G05D 1/0016; G05D 1/0088
See application file for complete search history.

(56) References Cited

U.S. PATENT DOCUMENTS 6,016,385 A 1/2000 Yee et al.
6,133,944 A 10/2000 Braun et al.
(Continued)

OTHER PUBLICATIONS

"International Search Report and Written Opinion", Application No. PCT/US2017/019228, dated May 31, 2017, 12 pages.
(Continued)

*Primary Examiner* — Obafemi O Sosanya
(74) *Attorney, Agent, or Firm* — Schwegman Lundberg & Woessner, P.A.

(57) ABSTRACT

In embodiments of immersive interactive telepresence, a system includes a vehicle that captures an experience of an environment in which the vehicle travels, and the experience includes audio and video of the environment. User interactive devices receive the audio and the video of the environment, and each of the user interactive devices represent the experience for one or more users who are remote from the environment. A trajectory planner is implemented to route the vehicle based on obstacle avoidance and user travel intent as the vehicle travels in the environment. The trajectory planner can route the vehicle to achieve a location objective in the environment without explicit direction input from a vehicle operator or from the users of the user interactive devices.

19 Claims, 6 Drawing Sheets

(51) Int. Cl.
  *G05D 1/00* (2006.01)
  *B64C 39/02* (2006.01)
  *G01C 21/34* (2006.01)
  *G08G 5/00* (2006.01)

(56) References Cited

U.S. PATENT DOCUMENTS

| | | | |
|---|---|---|---|
| 7,714,895 | B2 | 5/2010 | Pretlove et al. |
| 7,949,616 | B2 | 5/2011 | Levy et al. |
| 8,004,558 | B2 | 8/2011 | Prechtl et al. |
| 9,014,848 | B2 | 4/2015 | Farlow et al. |
| 9,079,313 | B2 | 7/2015 | Olivier et al. |
| 9,185,391 | B1 | 11/2015 | Prechtl |
| 2003/0180697 | A1 | 9/2003 | Kim et al. |
| 2010/0205060 | A1 | 8/2010 | Athsani et al. |
| 2013/0176192 | A1 | 7/2013 | Varga et al. |
| 2013/0211587 | A1 | 8/2013 | Stephens |
| 2015/0244903 | A1 | 8/2015 | Adams |
| 2016/0035224 | A1* | 2/2016 | Yang .............. H04B 7/18506 701/23 |
| 2017/0174344 | A1* | 6/2017 | Lema .............. B64C 39/024 |

OTHER PUBLICATIONS

Gaemperle,"An Immersive Telepresence System Using a Real-Time Omnidirectional Camera and a Virtual Reality Head-Mounted Display", In Proceedings of the IEEE International Symposium on Multimedia, Dec. 10, 2014, pp. 175-178.

Shumaker,"Virtual, Augmented and Mixed Reality", In Proceedings of 7th International Conference on Virtual, Augmented and Mixed Reality, Aug. 2, 2015, 1 pages.

Zachares,"DORA: Realistic Teleoperating Robot Experience With Oculus Rift", Available at: https://virtualrealityreporter.com/dora-robot-oculus-rift-hmd-telepresence-teleoperated-immersive/, Jun. 8, 2015, 6 pages.

* cited by examiner

IMMERSIVE INTERACTIVE TELEPRESENCE

BACKGROUND

Remotely controlled vehicles have become increasingly popular, particularly with respect to mobilized robots, land rovers, and unmanned aerial vehicles (UAVs), also commonly referred to as "drones". Typically, these types of vehicles include a camera or cameras that allow video of the environment in which a vehicle operates to be captured and transmitted back to an operator of the vehicle for display on a display screen at the operator's location. This provides a first person view of what the operator would see if he or she were at the vehicle's location, or traveling on the vehicle. These types of remotely controlled vehicles typically have a one-to-one correspondence, or pairing, between the operator and the vehicle for teleoperation, where a user input is communicated to the vehicle, which then performs accordingly. Other types of systems only provide a user with telepresence, where the user may simply watch video and/or hear audio of a remote environment, but without being able to control the vehicle, device, or system sending back the video and audio of the remote environment.

SUMMARY

This Summary introduces features and concepts of immersive interactive telepresence, which is further described below in the Detailed Description and/or shown in the Figures. This Summary should not be considered to describe essential features of the claimed subject matter, nor used to determine or limit the scope of the claimed subject matter.

Immersive interactive telepresence is described. In embodiments, a system includes a vehicle that captures an experience of an environment in which the vehicle travels, and the experience includes audio and video of the environment. The vehicle may be any type of a drone, a submersible, a land rover, a mobilized computing device, a human camera carrier, and/or any other type of a camera transport. User interactive devices receive the audio and the video of the environment, and each of the user interactive devices represent the experience for one or more users who are remote from the environment. A trajectory planner is implemented to route the vehicle based on obstacle avoidance and user travel intent as the vehicle travels in the environment. The trajectory planner can route the vehicle without step-by-step travel instructions to achieve a location objective in the environment, such as without explicit direction input from a vehicle operator or from the users of the user interactive devices. The trajectory planner can also determine the user travel intent to route the vehicle based on previous vehicle routing associated with the users of the user interactive devices, or based on a user preference provided prior to a start of the vehicle traveling in the environment. The trajectory planner can then alter the route of the vehicle in the environment based on the determined user travel intent.

In other aspects, a vehicle can be commissioned by the users who are remote from the environment to capture the experience of an area of interest in the environment, where the area of interest is selected by the users, or the area of interest is selected by the trajectory planner based on the user travel intent. The vehicle can be controlled based on the trajectory planner receiving travel instructions from the users via the user interactive devices for user directed travel of the vehicle and/or based on a vehicle operator in the environment of the vehicle who directs the route of the vehicle.

In other aspects, a vehicle can include a camera system to capture the video as a wide angle view of the environment, and the video is routed to the user interactive devices where each of the users can view a different portion of the environment based on where a user is looking within the wide angle view of the environment. The trajectory planner can also route the vehicle in a steady motion effective to minimize motion sickness of the users of the user interactive devices who are watching the video.

In other aspects, a vehicle can be a virtual tourist guide in the environment and capture the experience of the environment as a virtual tour for the users of the user interactive devices. The trajectory planner is implemented to route the vehicle effective to facilitate the virtual tour. In implementations, the vehicle is an aerial drone that flies over a region of the environment to capture the experience of the region for the users of the user interactive devices. Additional aerial drones can each fly over a different region of the environment, and the aerial drone hands off the users to one of the additional aerial drones that captures the experience of a different region of the environment for the users of the user interactive devices. The trajectory planner can initiate the handoff of the users to the additional aerial drone based on the different region of the environment selected by the users, or the different region of the environment can be selected by the trajectory planner based on the user travel intent.

BRIEF DESCRIPTION OF THE DRAWINGS

Embodiments of immersive interactive telepresence are described with reference to the following Figures. The same numbers may be used throughout to reference like features and components that are shown in the Figures.

DETAILED DESCRIPTION

Embodiments of immersive interactive telepresence are described, and can be implemented to provide a vehicle that captures an experience of an environment in which the vehicle travels, where the experience includes audio and video of the environment (e.g., environment experience data) that can be represented as a virtual tour to a group of users on user interactive devices. The vehicle that travels in the environment to capture the environment experience data may be any type of a drone, a submersible, a land rover, a mobilized computing device, a human camera carrier, and/or any other type of a camera transport. User interactive devices receive the audio and the video of the environment, and each of the user interactive devices represent the experience for one or more users who are remote from the environment.

The vehicle can travel in the environment based on obstacle avoidance and user travel intent, where a trajectory planner can route the vehicle without step-by-step travel instructions to achieve a location objective in the environment, such as without explicit direction input from a vehicle operator or from the users of the user interactive devices. The trajectory planner can determine the user travel intent to route the vehicle based on previous vehicle routing associated with the users of the user interactive devices, or based on a user preference provided prior to a start of the vehicle traveling in the environment. The trajectory planner can then alter the route of the vehicle in the environment based on the determined user travel intent.

While features and concepts of immersive interactive telepresence can be implemented in any number of different devices, systems, networks, environments, and/or configurations, embodiments of immersive interactive telepresence are described in the context of the following example devices, systems, and methods.

Figure 1:
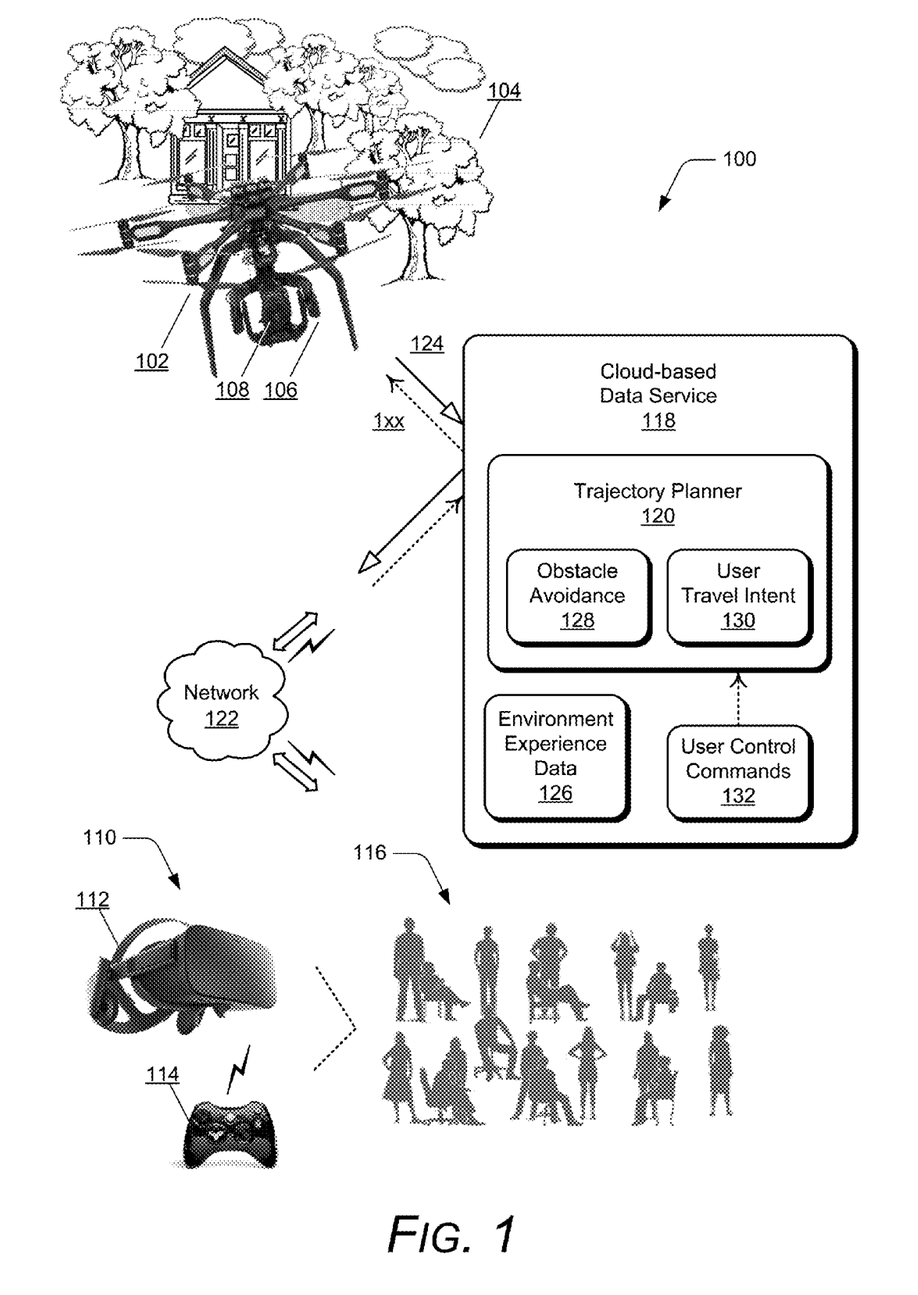
FIG. 1 illustrates an example system in which embodiments of immersive interactive telepresence can be implemented.

FIG. 1 illustrates an example system 100 in which embodiments of immersive interactive telepresence can be implemented. The example system 100 includes a vehicle 102, shown represented in this example as an unmanned aerial vehicle (UAV), also commonly referred to as a drone. In implementations, the vehicle 102 can be any one or combination of a drone, a submersible, a land rover, a mobilized computing device, a human camera carrier, and/or any other type of a camera transport. The vehicle is designed to capture an experience of the environment 104 in which the vehicle travels, where the experience includes audio and video of the environment.

The vehicle 102 includes an audio system 106 (e.g., microphones and/or other audio detection equipment) to capture the audio of the environment. The vehicle also includes a camera system 108 that is implemented to capture the video in two-dimensional or three-dimensional space of the environment in which the vehicle travels, such as when flying as a drone, traveling over land or in a building structure as a land rover, traveling in water as a submersible (e.g., under water or floating on top), or as any other vehicle implemented as a camera transport. The camera system 108 can include one or more camera devices, and the camera devices can operate together to capture the video of the environment from a common viewpoint, or operate independently to each capture the video of the environment from a different viewpoint.

The example system 100 includes user interactive devices 110 that receive the audio and the video of the environment, as captured by the audio system 106 and the camera system 108 of the vehicle 102. The user interactive devices 110 can include viewing devices 112 and/or controller devices 114 for multiple users 116 of the devices. The user interactive devices 110 receive the audio and the video of the environment from the vehicle 102, and represent the experience of the environment for one or more users 116 who are remote from the environment. In implementations, any of the users may be using different types of the viewing devices 112, such as any type of a virtual reality headset, virtual reality glasses, an augmented reality headset, augmented reality glasses, a mobile device with an integrated display, and/or a display device coupled to a computing device.

The example system 100 includes a cloud-based data service 118 that implements a trajectory planner 120 for the vehicle 102 as a computer application. The cloud-based data service is accessible by the user interactive devices 110 via a network 122. Any of the devices, vehicles, servers, and/or services described herein can communicate via the network, such as for video and data communication between the user interactive devices 110 and the vehicle 102. The network can be implemented to include a wired and/or a wireless network. The network can also be implemented using any type of network topology and/or communication protocol, and can be represented or otherwise implemented as a combination of two or more networks, to include IP based networks and/or the Internet. The network may also include mobile operator networks that are managed by a mobile network operator and/or other network operators, such as a communication service provider, mobile phone provider, and/or Internet service provider.

The cloud-based data service 118 can include data storage that may be implemented as any suitable memory, memory device, or electronic data storage for network-based data storage. The data storage can maintain an instance of the trajectory planner 120 as an on-line application (e.g., as a network-based application) that is accessible by the user interactive devices 10 as well as by the vehicles described herein, such as the vehicle 102. The cloud-based data service 118 can also be implemented with server devices that are representative of one or multiple hardware server devices. Further, the cloud-based data service can be implemented with various components, such as a processing system and memory, as well as with any number and combination of differing components as further described with reference to the example device shown in FIG. 6 to implement the services, applications, servers, and other features of immersive interactive telepresence.

In implementations, the cloud-based data service 118 receives the audio and video 124 of the environment 104, as captured by the audio system 106 and the camera system 108 of the vehicle 102, and can maintain the audio and video of the environment as environment experience data 126. The user interactive devices 110 can receive the environment experience data 126 (e.g., the audio and video 124 of the environment) from the cloud-based data service 118, also referred to as the bridge between a vehicle, such as the vehicle 102, and the user interactive devices 110. Additionally, the audio of the environment in which the vehicle 102 travels is communicated to the user interactive devices 110 so that a user may both watch the video and listen to the corresponding audio for a realistic interactive telepresence in the environment 104 in which the vehicle travels. Additionally, the users of a group can talk between each other to coordinate their actions and inputs to control the vehicle 102.

In embodiments, the camera system 108 of the vehicle 102 is implemented to capture the video 124 as a wide angle view of the environment, and the video is routed via the cloud-based data service 118 to the user interactive devices 110. The camera system 108 can include camera devices arranged to capture a wide angle spherical view (e.g., a 180 degree view or a 360 degree view), along with the surround sound audio. In implementations, a fisheye camera attached to the vehicle 102 can capture a stereo or mono wide angle field of view (e.g., a mono 120-180 degree view). Alternatively, camera configurations may include multiple camera devices, such as a pair of parallel fisheye, wide angle cameras (e.g., with 120-180 degree field of view), and having a baseline equal to an average human interpupillary distance (IPD) or distance between eye centers.

The multiple camera devices may also be arranged as a stereo polygon, with a set of stereo cameras having a baseline equal to human IPD, and the stereo polygon arrangement may be a hexagon, square, or a half hexagon. The multiple camera devices may also be arranged as a camera circle, with wide angle cameras positioned in a circle, such as arranged in a camera sphere, hemisphere, or the cameras arranged in a spherical setup (at dodecahedron vertices for example). The video data can be stacked into a combined frame (of several individual camera frames) and compressed in H264 or H265/HEVC format. The audio data can also be compressed individually, such as for each microphone input, and the encoded video and audio data is communicated to the cloud-based data service.

The captured audio and video 124 from the environment 104 is streamed as a multi-cast distribution to the user interactive devices 110 (e.g., virtual reality or augmented reality glasses) via the cloud-based data service 118. In implementations, the whole wide angle view of the video is streamed to the user interactive devices 110 without cropping its frustrum. This provides that each of the users 116 of the user interactive devices 110 can view a different portion of the environment based on where a user is looking within the wide angle view of the environment. Each of the users 116 of the respective user interactive devices 110 can have a unique, immersive view of the environment with audio, even though the users all share the same video feed from the remote vehicle.

The environment can be virtually represented digitally with very low latency, and from any view point or head position of the users, and a user can freely look around with little or no rendering latency, which creates a real-time immersive interactive telepresence in the environment for the user. The generated, virtual representation of the environment 104 is digital, which eliminates the problems of control lag with other systems that relay instructions to move the camera based on a user movement to view the environment from a different viewpoint. The unidirectional aspect of the audio and video 124 being communicated from the vehicle 102 to the user interactive devices 110 also reduces bandwidth constraints and processing of the back-and-forth instructions that would otherwise be passed through the cloud-based data service 118 with other systems.

In embodiments, the trajectory planner 120 is implemented by the cloud-based data service 118 to route the vehicle 102 based on obstacle avoidance 128 and user travel intent 130 as the vehicle 102 travels in the environment 104. The trajectory planner 120 can also be implemented to route the vehicle 102 in a steady motion effective to minimize motion sickness of the users of the user interactive devices. Based on the obstacle avoidance 128 and the user travel intent 130, the trajectory planner 120 can route the vehicle 102 in the environment 104 without step-by-step travel instructions, and can achieve a location objective in the environment without explicit direction input from a vehicle operator or from the one or more users of the user interactive devices.

For example, the trajectory planner 120 can determine the user travel intent 130 to route the vehicle 102 based on previous vehicle routing associated with one or more of the users 116 of the user interactive devices, and then alter the route of the vehicle in the environment based on the determined user travel intent. Alternatively or in addition, the trajectory planner 120 can determine the user travel intent 130 to route the vehicle 102 based on a user preference provided prior to a start of the vehicle traveling in the environment, and alter the route of the vehicle in the environment based on the determined user travel intent. The user travel intent can be determined by the trajectory planner 120 from the users' historical preferences, such as when previously virtually touring the environment. The user travel intent can also be determined from user preferences that are uploaded or communicated to the cloud-based data service 118, such as when a group of the users set out to commission a vehicle for a virtual tour of the environment in which the vehicle travels and operates.

Overall, the trajectory planner 120 is implemented to route the vehicle 102 in the environment 104 based on any one or combination of several inputs, such as user preferences, user intent, environment constraints (e.g., collision and obstacle avoidance 128, remote sensor information, fly/no-fly zones, wayward points of travel, etc.), and reduction of motion sickness for the users who are watching the video on the user interactive devices 110 (e.g., the viewing devices 112). Although the trajectory planner 120 is shown and described in this example system 100 as being implemented by the cloud-based data service 118, a vehicle itself may be implemented with the trajectory planner and implement the functions and aspects of the trajectory planner as described herein. An example of a vehicle that incorporates the trajectory planner is shown and described with reference to FIG. 3.

In embodiments, the vehicle 102 may be commissioned (e.g., borrowed, rented, and the like) by a group of the users 116 who are remote from the environment 104 to capture the experience of an area of interest in the environment, where the area of interest is selected by the users, or the area of interest selected by the trajectory planner 120 based on the user travel intent 130, as discussed above. The vehicle 102 can then be controlled in the environment 104 based on travel instructions that the trajectory planner receives as user control commands 132 from the users via the user interactive devices 110 (e.g., the controller devices 114) for user directed travel of the vehicle. Alternatively or in addition, the vehicle 102 can be controlled in the environment 104 by a vehicle operator who is also located in the environment (or who is local to the environment) and directs the route of the vehicle for the users, or contributes vehicle control with the users. As further described with reference to FIG. 3, a group of the users 116 can interact with the remote environment collaboratively, in the context of crowdsourcing to control camera movement to reposition the camera viewpoint, and/or to control the vehicle travel to reposition the camera viewpoint.

For a borrowed, rented, or commissioned vehicle, such as an aerial drone, a group of the users 116 can connect with a drone operator via the cloud-based data service 118 (e.g., the bridge to connect the devices), and the drone operator deploys the drone in a remote location that the user or users want to see virtually. As noted above, the group of users can connect to the drone (e.g., the vehicle 102) over the Internet (e.g., the network 122) and can fly the drone from a first person view utilizing the user interactive devices 110. The remote drone operator can intervene and take control over the drone at any point to prevent problems, such as for example communication link issues, latency issues, regulations, collision and obstacle avoidance, etc.

Figure 2:
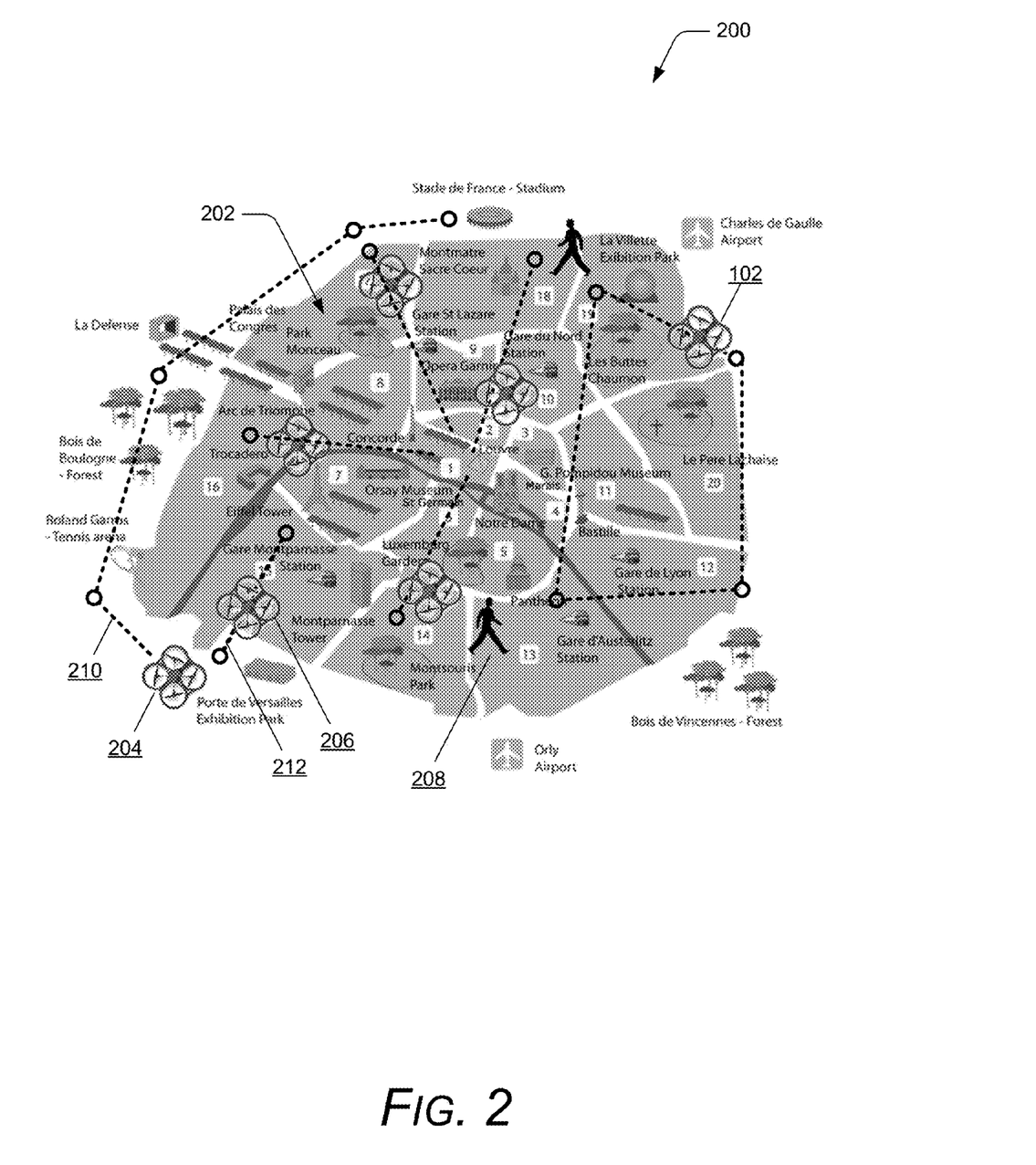
FIG. 2 further illustrates the example embodiments of immersive interactive telepresence.

FIG. 2 illustrates an example system 200 in which embodiments of immersive interactive telepresence can be implemented. In embodiments, a vehicle as described herein can be utilized as a virtual tourist guide in an environment 202 to capture the experience as a virtual tour for the users 116 of the user interactive devices 110, and the trajectory planner 120 can determine and control the vehicle route in the environment effective to facilitate the virtual tour. In this example, the environment 202 is the city of Paris, and several of the vehicles (e.g., vehicle 102, for example) are shown as aerial drones that fly over regions of the environment to capture the experience for the users of the user interactive devices 110. Additionally, a drone operator may serve as a tour guide by controlling a vehicle 102 as it travels in the environment.

The various vehicles, such as aerial drones 204 and 206, each fly over a different region of the city (e.g., the environment 202). As described above, any of the vehicles may include any one or combination of a drone (e.g., 204, 206), a submersible, a land rover, a mobilized computing device, a human camera carrier 208, and/or any other type of a camera transport. In this example, the aerial drone 204 travels a designated path 210 along an outer boundary of the city, and the aerial drone 206 travels along a path 212 between an end point of the aerial drone 204 and the Eiffel Tower. In embodiments, the trajectory planner 120 of a vehicle can initiate the handoff of the users to an additional aerial drone based on the different region of the environment selected by the one or more users, or the different region of the environment can be selected by the trajectory planner based on the user travel intent 130. For example, users associated with the aerial drone 204 can be handed off to the aerial drone 206 for the virtual tour experience of the different region of the environment (e.g., to experience the Eiffel Tower in the city of Paris).

Figure 3:
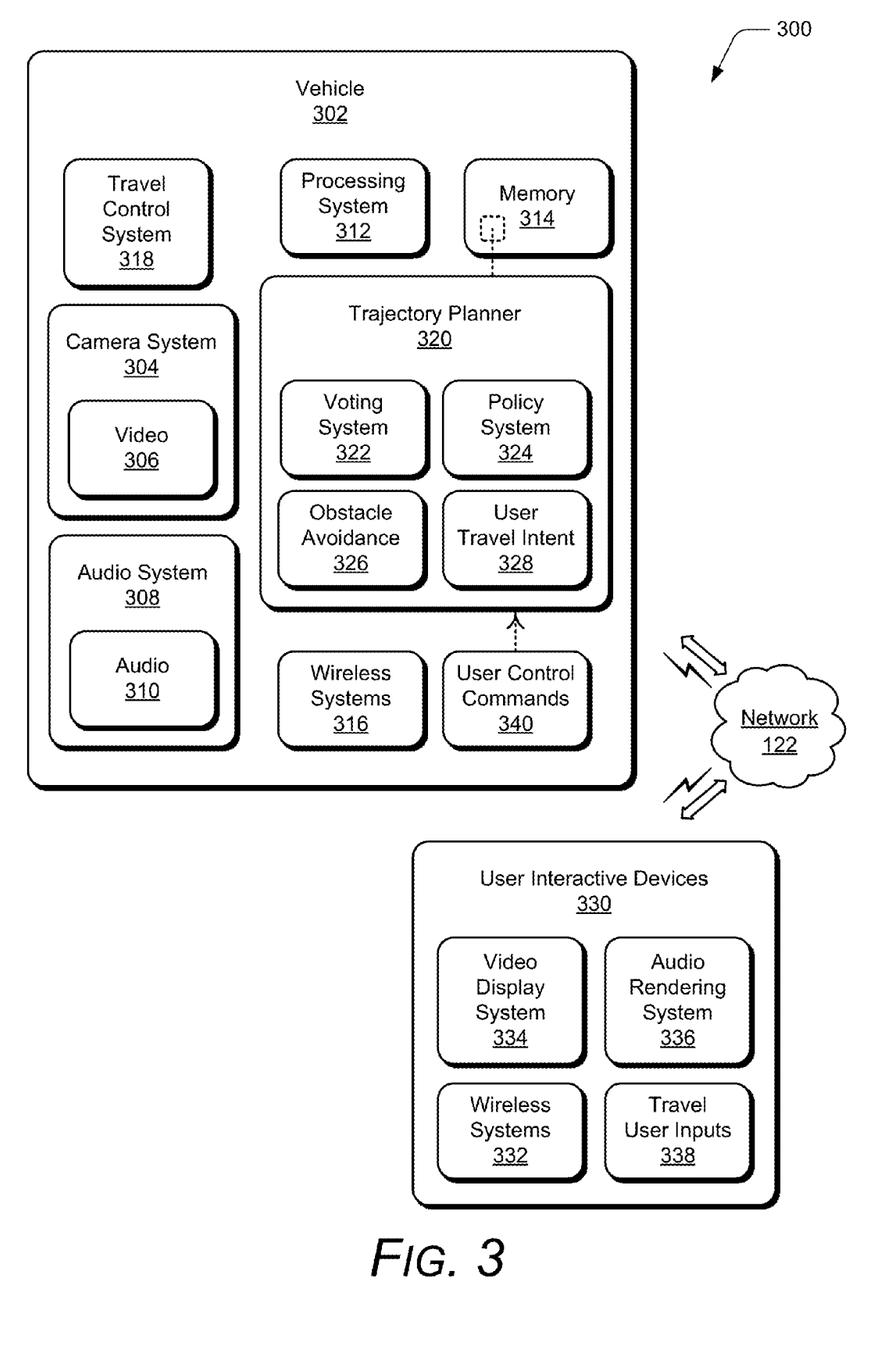
FIG. 3 illustrates another example system in which embodiments of immersive interactive telepresence can be implemented.

FIG. 3 illustrates an example system 300 in which embodiments of immersive interactive telepresence can be implemented. The example system 300 includes a vehicle 302, such as the vehicle 102 shown and described with reference to FIG. 1. In implementations, the vehicle 302 may be any one or combination of an unmanned aerial vehicle (a drone), a submersible, a land rover, a mobilized computing device, a human camera carrier, and/or any other type of a camera transport. The vehicle 302 includes a camera system 304 that is implemented to capture the video 306 of the environment in which the vehicle travels, such as when flying as a drone, traveling over land or in a building structure as a land rover, traveling in water as a submersible (e.g., under water or floating on top), or as any other vehicle implemented as a camera transport. The camera system 304 can include one or more camera devices, and the camera devices can operate together to capture the video 306 of the environment from a common viewpoint, or operate independently to each capture the video of the environment from a different viewpoint. The vehicle 302 also includes an audio system 308 to capture the surround sound audio 310 of the environment.

In this example, the vehicle 302 is implemented with various components, such as a processing system 312 and memory 314 (e.g., non-volatile, physical memory), and with any number and combination of differing components as further described with reference to the example device shown in FIG. 6. Although not shown, the vehicle 302 includes a power source, such as a battery, to power the various device components and a propulsion apparatus or system of the vehicle. Further, the vehicle 302 is a wireless communication-enabled device with one or more wireless systems 316 implemented to support several radio access technologies, which may include Wi-Fi, Bluetooth™, Mobile Broadband, LTE, as well as 802.11a/b/g/n/ac network connectivity technologies, and/or any other wireless communication system or format. Generally, the vehicle 302 includes a wireless communication system 316 that includes a radio device, antenna, and chipset that is implemented for wireless communication with other devices, networks, and services.

The vehicle 302 also includes a travel control system 318 that controls the vehicle in the environment in which it travels. The travel control system 318 integrates with the propulsion apparatus or system of the vehicle, and may implemented as software, firmware, hardware (e.g., fixed logic circuitry, motor drives, etc.), or any combination thereof. Similarly, the camera system 304 may include a camera control system (not shown) that integrates to independently control the position of camera devices of the camera system on the vehicle, and the camera control system processes the video for communication to the viewing devices.

The vehicle 302 includes a trajectory planner 320, such as the trajectory planner 120 for the vehicle 102 described with reference to FIG. 1. The trajectory planner 320 can be implemented as a software application or module, such as computer-executable software instructions that are executable with the processing system 312 to implement embodiments of immersive interactive telepresence. As indicated, the trajectory planner 320 can be stored on computer-readable storage memory (e.g., the memory 314), such as any suitable memory device or electronic data storage implemented in the vehicle. Additionally, the trajectory planner 320 is implemented in this example with a voting system 322 and a policy system 324. Although shown as integrated components or modules of the trajectory planner 320, either or both of the voting system 322 and the policy system 324 may be implemented independent of the trajectory planner 320, either in the vehicle 302 and/or in other devices. The trajectory planner 320 also includes obstacle avoidance 326 and user travel intent 328, as shown and described with reference to FIG. 1.

In embodiments, the trajectory planner 320 of the vehicle 102 (or the cloud-based data service 118) can be implemented with the policy system and/or the voting system to generate a consensus travel instruction based on each of the travel user inputs 338 counted as a user vote to direct the travel of the vehicle. The travel control system 318 of the vehicle 302 may also generate a voting input to the voting system 322 to direct the travel of the vehicle. In implementations, the voting input of the travel control system 318 can be weighted to account for instances when the consensus travel instruction that is generated based on the group input is overridden, such as for obstacle avoidance by the vehicle. In addition, the policy system 324 of the trajectory planner 320 may contribute to generate the consensus travel instruction based on each of the travel user inputs 338 counted as a weighted vote to direct the travel of the vehicle.

As a matter of policy for example, some user inputs of proposed travel instructions and/or proposed camera viewpoints may be weighted higher or lower based on user factors, such as whether the user appears to intentionally provide poor input, the age or experience of the user, a skill level of the user with the particular type of vehicle, and any other type of factor that may be considered when weighting user inputs. Additionally, the policy system may include a monetized aspect by which a user can pay to control the vehicle, such as for a duration of time or for a duration of travel, or the user may have his or her input weighted significantly greater than the other users of the group that are contributing to the collaborative effort of camera viewpoint control for the interactive telepresence experience.

The trajectory planner 320 and travel control system 318 of the vehicle 302 may also be implemented to override a travel instruction that is generated based on the group input as a matter of policy for some other undesirable travel result, such as a travel instruction to shut off an aerial drone while it is flying, or to avoid sudden and/or erratic motions of the vehicle that may lead to motion sickness in the users viewing the video of the environment. In some instances, the policy system may override the voting system, as noted above, to prevent an undesirable outcome of the vehicle travel that would affect all of the users of the group who are collaborating for an interactive telepresence in the environment in which the vehicle travels.

In embodiments, the trajectory planner 320 is implemented to route the vehicle 302 based on the obstacle avoidance 326 and the user travel intent 328 as the vehicle travels in the environment. The trajectory planner 320 can route the vehicle without step-by-step travel instructions to achieve a location objective in the environment, such as without explicit direction input from a vehicle operator or from the users of the user interactive devices. The trajectory planner 320 can also determine the user travel intent 328 to route the vehicle 302 based on previous vehicle routing associated with the users of the user interactive devices, or based on a user preference provided prior to a start of the vehicle traveling in the environment. The trajectory planner can then alter the route of the vehicle in the environment based on the determined user travel intent.

The example system 300 also includes the user interactive devices 330, such as the viewing devices 112 and associated controller devices 114 that are shown and described with reference to FIG. 1. Similar to the vehicle 302 (e.g., in the context of a computing-enabled device), the user interactive devices 330 can each be implemented with a processing system and memory (e.g., physical memory), as well as with a power source (e.g., a battery) to power the device components. The memory can maintain software applications, such as device applications and an operating system of the device. Additionally, any of the user interactive devices 330 can be implemented with any number and combination of differing components as further described with reference to the example device shown in FIG. 6. The user interactive devices 330 can also be wireless communication-enabled devices with one or more wireless systems 332 implemented to support the several radio access technologies described above.

The user interactive devices 330 also include some form of a video display system 334 to display the video 306 that is captured by the camera system 304 of the vehicle 302, and include an audio rendering system 336 to playback the audio 310 that is captured by the audio system 308 of the vehicle 302. The video 306 and the audio 310 (e.g., the environment experience data 126) can be communicated to the user interactive devices 330 from the vehicle 302 (e.g., via the network 122), and the environment experience data 126 of the environment in which the vehicle travels can be rendered and displayed to the respective users of the user interactive devices. Alternatively, the environment experience data 126 can be communicated to the user interactive devices 330 from the cloud-based data service 118, as shown and described with reference to FIG. 1.

As described, the camera system 304 of the vehicle 302 can also include a camera control system that processes the video 306 for communication to the cloud-based data service 118 and/or to the user interactive devices 330. In implementations, the video 306 is captured by the cameras of the camera system 304 and image frames of the video are stacked into a combined frame and converted to a YUV color space image format. The combined frame is then compressed as H.264 (e.g., the H.264 protocol as discussed in the ITU-T H.264 Recommendation (February 2014)) and sent over the network 122 (e.g., the Internet) in a real-time transport protocol (RTP) package over user datagram protocol (UDP) or hyper-text transfer protocol (HTTP) to the cloud-based data service or to the user interactive devices (or utilizing the TCP/IP protocol to connect the client devices and/or the camera system to a cloud-based service). The user interactive devices 330 can receive the RTP package over UDP or HTTP, and the compressed H.264 frame is unpacked from the RTP package. The compressed frame is then uncompressed and converted to the RGB color space format, which is displayed as the video on the video display system 334 of a respective user interactive device.

As described above with reference to FIG. 1, the controller devices 114 that are associated with the viewing devices 112 can be used for travel user inputs 338 as a proposed travel instructions to the vehicle 302 and/or as proposed camera viewpoints to reposition the camera system 304, or a camera device of the camera system, that is transported by the vehicle. The group of users of the user interactive devices 330 can collaborate to control the viewpoint of the camera system 304 that is transported by the vehicle 302 for an interactive telepresence in the environment in which the vehicle travels. The group of users can interact with the remote environment collaboratively, in the context of crowdsourcing, to control camera movement to reposition the camera viewpoint, and/or to control the vehicle travel to reposition the camera viewpoint. The proposed travel instructions and the proposed camera viewpoints that are the travel user inputs 338 can be collectively communicated to the vehicle 302 as the user control commands 340.

In this example system 300, the trajectory planner 320 of the vehicle 302 receives the collective user control commands 340 and can generate a consensus travel instruction for the vehicle 302 based on the proposed travel instructions. As described above, the trajectory planner 320 implements the voting system 322 to generate the consensus travel instruction based on each of the proposed travel instructions counted as a user vote to direct the travel of the vehicle. Similarly, the trajectory planner 320 implements the policy system 324 to generate the consensus travel instruction based on each of the proposed travel instructions counted as a weighted vote to direct the travel of the vehicle. The trajectory planner 320 can then communicate the travel instructions to the travel control system 318 effective to instruct the vehicle how to travel in the environment (e.g., any one or combination of stop, brake, start, accelerate, turn-off the vehicle, turn-on the vehicle, travel up, travel down, turn left, turn right, turn around, rotate, travel forward, and travel back). Similarly, the trajectory planner 320 receives the collective user control commands 340 and can generate a consensus camera viewpoint to reposition one or more cameras of the camera system 304 based on the proposed camera viewpoints.

Example methods 400 and 500 are described with reference to respective FIGS. 4 and 5 in accordance with one or more embodiments of immersive interactive telepresence. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
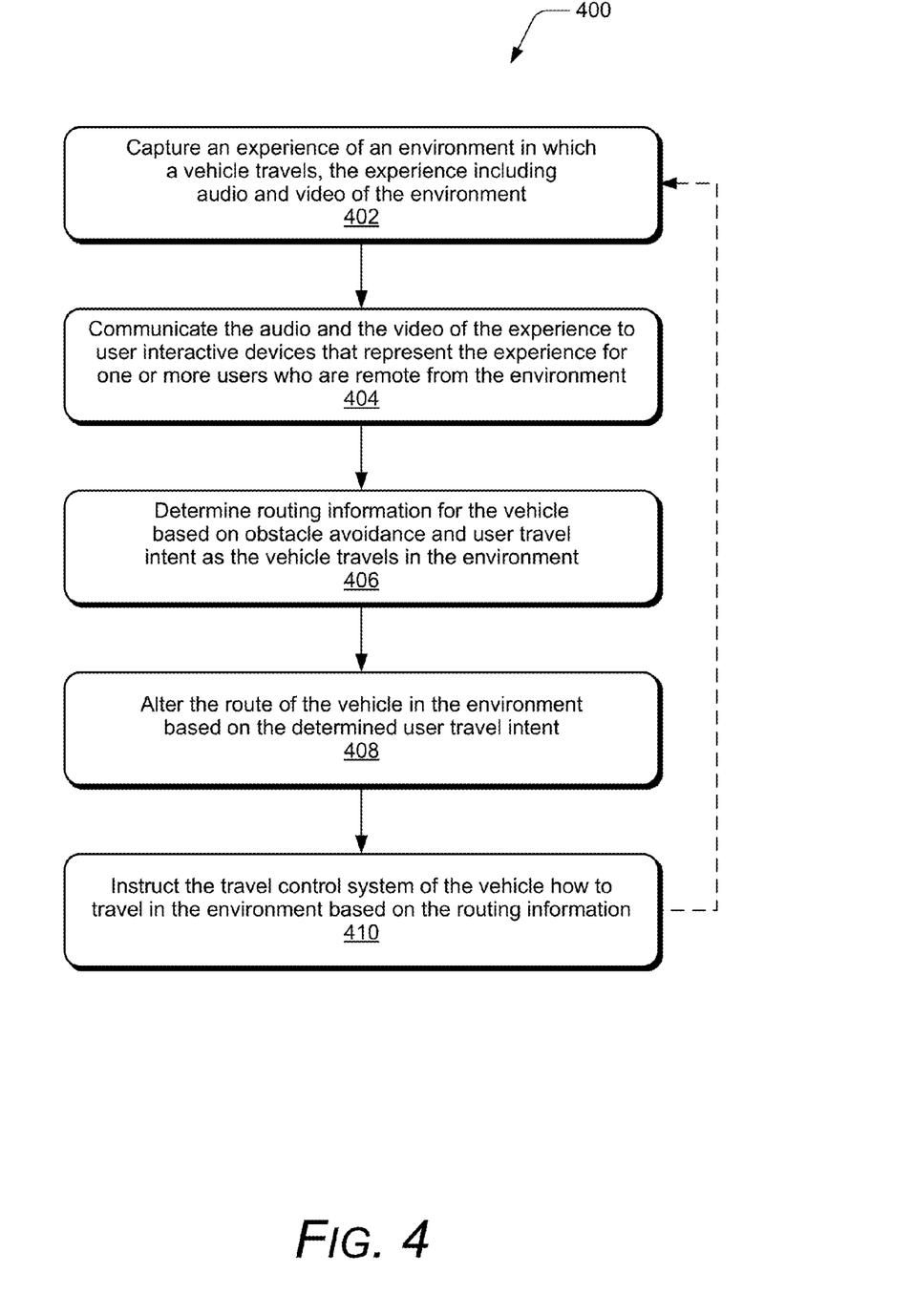
FIG. 4 illustrates example method(s) of immersive interactive telepresence in accordance with one or more embodiments.

FIG. 4 illustrates example method(s) 400 of immersive interactive telepresence, and is generally described with reference to a vehicle that transports audio and camera systems. The order in which the method is described is not intended to be construed as a limitation, and any number or combination of the method operations can be performed in any order to implement a method, or an alternate method.

At 402, an experience is captured of an environment in which a vehicle travels, the experience including audio and video of the environment. For example, the vehicle 102 includes the audio system 106 (e.g., microphones and/or other audio detection equipment) to capture the audio of the environment 104, and the vehicle 102 includes the camera system 108 that captures the video 124 in two-dimensional or three-dimensional space of the environment in which the vehicle travels, such as when flying as a drone, traveling over land or in a building structure as a land rover, traveling in water as a submersible (e.g., under water or floating on top), or as any other vehicle implemented as a camera transport. The camera system 108 can include one or more camera devices, and the camera devices operate together to capture the video of the environment from a common viewpoint, or operate independently to each capture the video of the environment from a different viewpoint. In implementations, multiple cameras of the camera system 108 each capture the video from a different viewpoint of the environment. In implementations, the video of the experience (e.g., a virtual tour) can be captured as a wide angle view of the environment, such as by an aerial drone that flies over a region of the environment and captures the environment experience data 126 for one or more of the users 116 of the user interactive devices 110.

At 404, the audio and the video of the experience is communicated to user interactive devices that represent the experience for one or more users who are remote from the environment. For example, the vehicle 102 communicates the audio and video 124 to the cloud-based data service 118 (also referred to as the devices bridge), and the user interactive devices 110 receive the audio and the video of the environment from the vehicle 102 via the cloud-based data service. The captured audio and video 124 from the environment 104 is streamed as a multi-cast distribution to the user interactive devices 110 (e.g., virtual reality or augmented reality glasses) via the cloud-based data service 118. Each of the users 116 of the user interactive devices 110 can view a different portion of the environment based on where a user is looking within the wide angle view of the environment, and each user can have a unique, immersive view of the environment with audio, even though the users all share the same video feed from the remote vehicle. The user interactive devices may be different types of devices, such as any type of a virtual reality headset, virtual reality glasses, an augmented reality headset, augmented reality glasses, a mobile device with an integrated display, and/or a display device coupled to a computing device.

At 406, routing information for the vehicle is determined based on obstacle avoidance and user travel intent as the vehicle travels in the environment. For example, the trajectory planner 120 implemented by the cloud-based data service 118 routes the vehicle 102 based on obstacle avoidance 128 and user travel intent 130 as the vehicle 102 travels in the environment 104. The trajectory planner 120 can also route the vehicle 102 in a steady motion effective to minimize motion sickness of the users of the user interactive devices. Based on the obstacle avoidance 128 and the user travel intent 130, the trajectory planner 120 routes the vehicle 102 in the environment 104 without step-by-step travel instructions, and can achieve a location objective in the environment without explicit direction input from a vehicle operator or from the one or more users of the user interactive devices.

At 408, the route of the vehicle in the environment is altered based on the determined user travel intent. For example, the trajectory planner 120 determines the user travel intent 130 to route the vehicle 102 based on previous vehicle routing associated with one or more of the users 116 of the user interactive devices, and then alters the route of the vehicle 102 in the environment 104 based on the determined user travel intent. Alternatively or in addition, the trajectory planner 120 determines the user travel intent 130 to route the vehicle 102 based on a user preference provided prior to a start of the vehicle traveling in the environment, and alters the route of the vehicle 102 in the environment 104 based on the determined user travel intent.

At 410, the travel control system of the vehicle is instructed as to how the vehicle is to travel in the environment based on the routing information. For example, the trajectory planner 120 communicates routing information to the travel control system 318 effective to instruct the vehicle how to travel (e.g., any one or combination of stop, brake, start, accelerate, turn-off the vehicle, turn-on the vehicle, travel up, travel down, turn left, turn right, turn around, rotate, travel forward, and travel back). The trajectory planner 120 routes the vehicle 102 in the environment 104 based on any one or combination of several inputs, such as user preferences, user intent, environment constraints (e.g., collision and obstacle avoidance 128, remote sensor information, fly/no-fly zones, wayward points of travel, etc.), and reduction of motion sickness for the users who are watching the video on the user interactive devices 110 (e.g., the viewing devices 112). Optionally, the method 400 can continue at 402 to capture the environment experience data.

Figure 5:
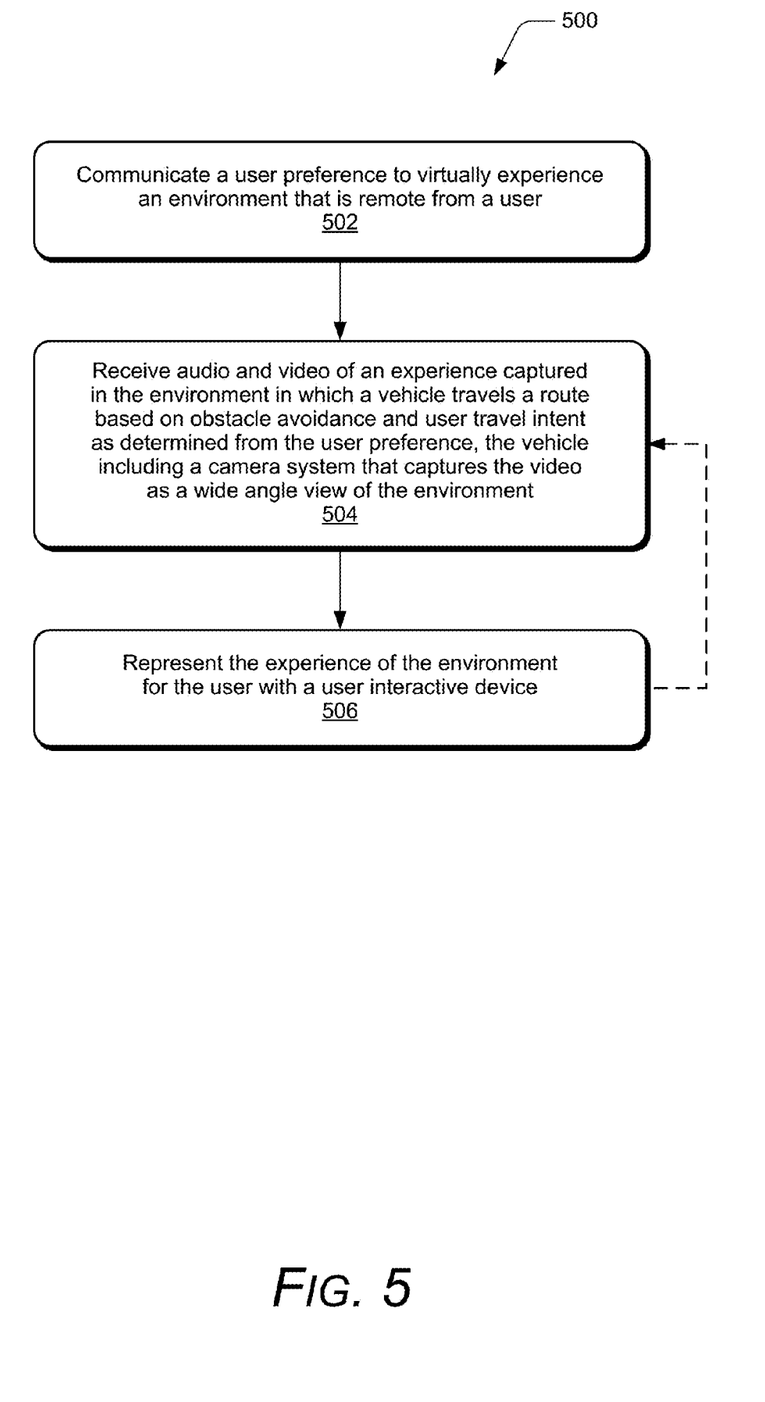
FIG. 5 illustrates example method(s) of immersive interactive telepresence in accordance with one or more embodiments.

FIG. 5 illustrates example method(s) 500 of immersive interactive telepresence, and is generally described with reference to user interactive devices. The order in which the method is described is not intended to be construed as a limitation, and any number or combination of the method operations can be performed in any order to implement a method, or an alternate method.

At 502, a user preference is communicated to virtually experience an environment that is remote from a user. For example, a user interactive device 110 is utilized to communicate a user preference, such as a user travel intent 130, to the cloud-based data service 118 to initiate a virtual experience of an environment that is remote from a user. The experience of the environment can be a virtual tour that is represented with the user interactive device 110 for the user, and the vehicle 102 is a virtual tourist guide being routed in the environment 104 effective to facilitate the virtual tour, where the vehicle can alter the route in the environment based on the determined user travel intent.

At 504, audio and video is received of an experience captured in the environment in which a vehicle travels a route based on obstacle avoidance and user travel intent as determined from the user preference, the vehicle including a camera system that captures the video as a wide angle view of the environment. For example, the user interactive devices 110 receive the audio and the video of the environment from the vehicle 102 via the cloud-based data service. The captured audio and video 124 from the environment 104 is streamed as a multi-cast distribution to the user interactive devices 110 (e.g., virtual reality or augmented reality glasses) via the cloud-based data service 118.

At 506, the experience of the environment is represented for the user with the user interactive device. For example, each of the users 116 of the user interactive devices 110 can view a different portion of the environment based on where a user is looking within the wide angle view of the environment video, and each user can have a unique, immersive view of the environment with the surround audio, even though the users all share the same video feed from the remote vehicle. In implementations, any of the users may be using different types of the user interactive devices 110, such as any type of a virtual reality headset, virtual reality glasses, an augmented reality headset, augmented reality glasses, a mobile device with an integrated display, and/or a display device coupled to a computing device. Optionally, the method 500 can continue at 504 to receive the environment experience data.

Figure 6:
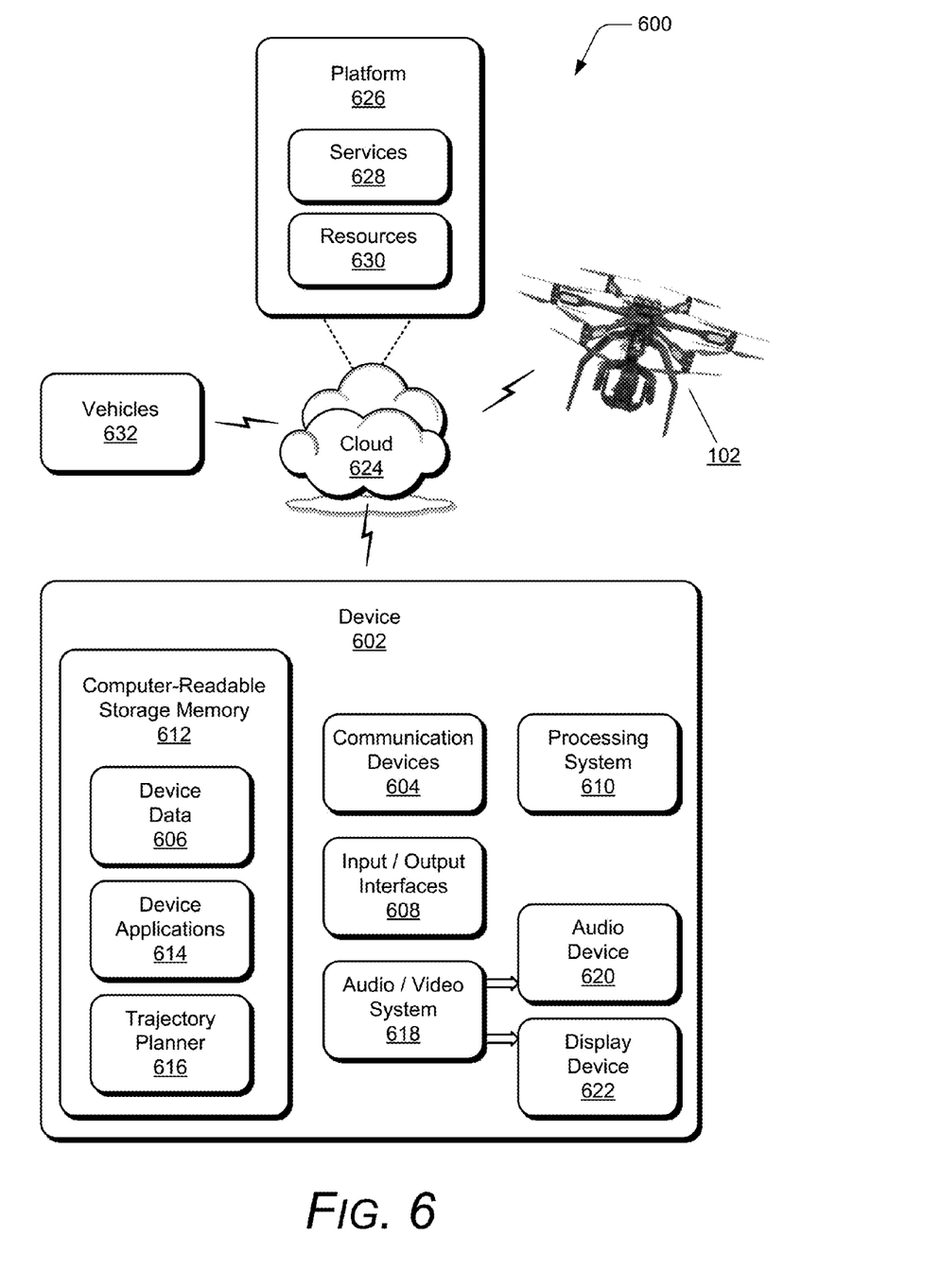
FIG. 6 illustrates an example system with an example device that can implement embodiments of immersive interactive telepresence.

FIG. 6 illustrates an example system 600 that includes an example device 602, which can implement embodiments of immersive interactive telepresence. The example device 602 can be implemented as any of the computing devices, user devices, vehicles (e.g., in the context of a computing device), and server devices described with reference to the previous FIGS. 1-5, such as any type of mobile device, wearable device, client device, mobile phone, tablet, computing, communication, entertainment, gaming, media playback, and/or other type of device. For example, the viewing devices, controller devices, and/or vehicles described herein may be implemented as the example device 602 or with various components of the example device.

The device 602 includes communication devices 604 that enable wired and/or wireless communication of device data 606, such as the video data captured by a camera system that is transported by a vehicle, audio data captured by an audio system of the vehicle, as well as the proposed user travel inputs and proposed camera viewpoints. Additionally, the device data can include any type of audio, video, and/or image data. The communication devices 604 can also include transceivers for cellular phone communication and for network data communication.

The device 602 also includes input/output (I/O) interfaces 608, such as data network interfaces that provide connection and/or communication links between the device, data networks, other devices, and the vehicles described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes a computer-readable storage memory 612, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 612 provides storage of the device data 606 and various device applications 614, such as an operating system that is maintained as a software application with the computer-readable storage memory and executed by the processing system 610. In this example, the device applications include a trajectory planner 616 that implements embodiments of immersive interactive telepresence, such as when the example device 602 is implemented as a vehicle as described herein with reference to FIGS. 1-3, or as part of the cloud-based data service 118 shown and described with reference to FIG. 1. Examples of the trajectory planner 616 include the trajectory planner 120 implemented by the cloud-based data service 118, and the trajectory planner 320 in the vehicle 302, as described with reference to FIGS. 1-5.

The device 602 also includes an audio and/or video system 618 that generates audio data for an audio device 620 and/or generates display data for a display device 622. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device.

In embodiments, at least part of the techniques described for immersive interactive telepresence may be implemented in a distributed system, such as over a "cloud" 624 in a platform 626. The cloud 624 includes and/or is representative of the platform 626 for services 628 and/or resources 630. The platform 626 abstracts underlying functionality of hardware, such as server devices (e.g., included in the services 628) and/or software resources (e.g., included as the resources 630), and connects the example device 602 with other devices, servers, vehicles 632, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud.

Although embodiments of immersive interactive telepresence have been described in language specific to features and/or methods, the appended claims are not necessarily limited to the specific features or methods described. Rather, the specific features and methods are disclosed as example implementations of immersive interactive telepresence, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

A system implemented for immersive interactive telepresence, the system comprising: a vehicle configured to capture an experience of an environment in which the vehicle travels, the experience comprising at least audio and video of the environment; user interactive devices configured to receive the audio and the video of the environment, each of the user interactive devices configured to represent the experience for one or more users who are remote from the environment; and a trajectory planner configured to route the vehicle based on obstacle avoidance and user travel intent as the vehicle travels in the environment.

Alternatively or in addition to the above described system, any one or combination of: The trajectory planner is configured to route the vehicle in the environment without step-by-step travel instructions received from the one or more users of the user interactive devices. The trajectory planner is configured to route the vehicle to achieve a location objective in the environment without explicit direction input from a vehicle operator or from the one or more users of the user interactive devices. The trajectory planner is configured to: determine the user travel intent to route the vehicle based on previous vehicle routing associated with the one or more users of the user interactive devices; and alter the route of the vehicle in the environment based on the determined user travel intent. The trajectory planner is configured to: determine the user travel intent to route the vehicle based on a user preference provided prior to a start of the vehicle traveling in the environment; and alter the route of the vehicle in the environment based on the determined user travel intent. The vehicle is commissioned by the one or more users who are remote from the environment to capture the experience of an area of interest in the environment, the area of interest selected by the one or more users or the area of interest selected by the trajectory planner based on the user travel intent. The vehicle is controlled based on at least one of: the trajectory planner receives travel instructions from the one or more users via the user interactive devices for user directed travel of the vehicle; or a vehicle operator in the environment of the vehicle who directs the route of the vehicle. The vehicle is a virtual tourist guide in the environment configured to capture the experience as a virtual tour for the one or more users of the user interactive devices; and the trajectory planner is configured to said route the vehicle effective to facilitate the virtual tour. The vehicle is an aerial drone configured to fly over a region of the environment to capture the experience of the region for the one or more users of the user interactive devices; and the system further comprising one or more additional aerial drones each configured to fly over a different region of the environment, the aerial drone configured to handoff the one or more users to one of the additional aerial drones that captures the experience of the different region of the environment for the one or more users of the user interactive devices. The trajectory planner is configured to initiate the handoff of the one or more users to the additional aerial drone based on the different region of the environment selected by the one or more users, or the different region of the environment selected by the trajectory planner based on the user travel intent. The vehicle includes a camera system configured to capture the video as a wide angle view of the environment; and the video is routed to the user interactive devices where each of the one or more users can view a different portion of the environment based on where a user is looking within the wide angle view of the environment. The trajectory planner is configured to said route the vehicle in a steady motion effective to minimize motion sickness of the one or more users of the user interactive devices.

A method for immersive interactive telepresence implemented by a vehicle comprises: capturing an experience of an environment in which the vehicle travels, the experience comprising at least audio and video of the environment; communicating the audio and the video of the experience to user interactive devices that represent the experience for one or more users who are remote from the environment; receiving routing information for the vehicle based on obstacle avoidance and user travel intent as the vehicle travels in the environment; and instructing a travel control system of the vehicle how to travel in the environment based on the routing information.

Alternatively or in addition to the above described method, any one or combination of: Determining the routing information for the vehicle to achieve a location objective in the environment without explicit direction input from a vehicle operator or from the one or more users of the user interactive devices. Determining the user travel intent to route the vehicle based on previous vehicle routing associated with the one or more users of the user interactive devices; and altering the route of the vehicle in the environment based on the determined user travel intent. Determining the user travel intent to route the vehicle based on a user preference provided prior to a start of the vehicle traveling in the environment; and altering the route of the vehicle in the environment based on the determined user travel intent. Flying over a region of the environment and said capturing the experience of the environment for the one or more users of the user interactive devices; and handing off the one or more users to an additional vehicle that flies over a different region of the environment and captures the experience of the different region of the environment for the one or more users of the user interactive devices. Capturing the video of the experience as a wide angle view of the environment; and said communicating the video to the user interactive devices where each of the one or more users can view a different portion of the environment based on where a user is looking within the wide angle view of the environment.

A method for immersive interactive telepresence implemented at a user interactive device comprises: communicating a user preference to virtually experience an environment that is remote from a user of the user interactive device; receiving audio and video of an experience captured in the environment in which a vehicle travels a route based on obstacle avoidance and user travel intent as determined from the user preference, the vehicle including a camera system that captures the video as a wide angle view of the environment; and representing the experience of the environment for the user with the user interactive device, the experience including displaying a portion of the environment based on where the user is looking within the wide angle view of the environment.

Alternatively or in addition to the above described method, any one or combination of: The experience of the environment is a virtual tour represented with the user interactive device for the user; and the vehicle is a virtual tourist guide being routed in the environment effective to facilitate the virtual tour, the vehicle configured to alter the route in the environment based on the determined user travel intent.

The invention claimed is:

1. A system implemented for immersive interactive telepresence, the system comprising:
    a vehicle configured to capture an experience of an environment in which the vehicle travels, the experience comprising at least audio and video of the environment, wherein the vehicle includes a camera system configured to capture the video as a wide angle view of the environment;
    a first interface, at the vehicle, to route the audio and the video of the environment to user interactive devices that are remote from the environment, wherein the video is routed to the user interactive devices to cause each of the one or more users to be able to view a different portion of the environment based on where a user is looking within the wide angle view of the environment, wherein the environment is virtually represented, at each user interactive device, based on a view point or a head position of a user; and
    a second interface, at the vehicle, to receive, from a trajectory planner, routing information to route the vehicle based on obstacle avoidance and user travel intent as the vehicle travels in the environment.

2. The system as recited in claim 1, wherein the trajectory planner is configured to route the vehicle in the environment without step-by-step travel instructions received from the one or more users of the user interactive devices.

3. The system as recited in claim 1, wherein the trajectory planner is configured to route the vehicle to achieve a location objective in the environment without explicit direction input from a vehicle operator or from the one or more users of the user interactive devices.

4. The system as recited m claim 1, wherein the trajectory planner is configured to:
    determine the user travel intent to route the vehicle based on previous vehicle routing associated with the one or more users of the user interactive devices; and
    alter the route of the vehicle in the environment based on the determined user travel intent.

5. The system as recited m claim 1, wherein the trajectory planner is configured to:
    determine the user travel intent to route the vehicle based on a user preference provided prior to a start of the vehicle traveling in the environment; and
    alter the route of the vehicle in the environment based on the determined user travel intent.

6. The system as recited in claim 1, wherein the vehicle is commissioned by the one or more users who are remote from the environment to capture the experience of an area of interest in the environment, the area of interest selected by the one or more users or the area of interest selected by the trajectory planner based on the user travel intent.

7. The system as recited in claim 6, wherein the vehicle is controlled based on at least one of:
    the trajectory planner receivs travel instructions from the one or more users via the user interactive devices for user directed travel of the vehicle; or
    vehicle operator in the environment of the vehicle who directs the route of the vehicle.

8. The system as recited in claim 1, wherein:
    the vehicle is a virtual tourist guide in the environment configured to capture the experience as a virtual tour for the one or more users of the user interactive devices; and
    the trajectory planner is configured to said route the vehicle effective to facilitate the virtual tour.

9. The system as recited in claim 1, wherein the vehicle is an aerial drone configured to fly over a region of the environment to capture the experience of the region for the one or more users of the user interactive devices; and
    the system further comprising:
    one or more additional aerial drones each configured to fly over a different region of the environment, the aerial drone configured to handoff the one or more users to one of the additional aerial drones that captures the experience of the different region of the environment for the one or more users of the user interactive devices.

10. The system as recited in claim 9, wherein the trajectory planner is configured to initiate the handoff of the one or more users to the additional aerial drone based on the different region of the environment selected by the one or more users, or the different region of the environment selected by the trajectory planner based on the user travel intent.

11. The system as recited in claim 1, wherein the trajectory planner is configured to said route the vehicle in a steady motion effective to minimize motion sickness of the one or more users of the user interactive devices.

12. A method for immersive interactive telepresence implemented by a vehicle, the method comprising:
    capturing an experience of an environment in which the vehicle travels, the experience comprising at least audio and video of the environment;
    capturing the video of the experience as a wide angle view of the environment;
    communicating the audio and the video of the experience to user interactive devices that represent the experience for one or more users who are remote from the environment, wherein communicating the video to the user interactive devices causes each of the one or more users to be able to view a different portion of the environment based on where a user is looking within the wide angle view of the environment, wherein the environment is virtually represented, at each user interactive device, based on a view point or a head position of a user;
    receiving routing information for the vehicle based on obstacle avoidance and user travel intent as the vehicle travels in the environment; and
    instructing a travel control system of the vehicle how to travel in the environment based on the routing information.

13. The method as recited in claim 12, further comprising determining the routing information for the vehicle to achieve a location objective in the environment without explicit direction input from a vehicle operator or from the one or more users of the user interactive devices.

14. The method as recited in claim 12, further comprising:
    determining the user travel intent to route the vehicle based on previous vehicle routing associated with the one or more users of the user interactive devices; and altering the route of the vehicle in the environment based on the determined user travel intent.

15. The method as recited in claim 12, further comprising:
determining the user travel intent to route the vehicle based on a user preference provided prior to a start of the vehicle traveling in the environment; and
altering the route of the vehicle in the environment based on the determined user travel intent.

16. The method as recited in claim 12, further comprising:
flying over a region of the environment and said capturing the experience of the environment for the one or more users of the user interactive devices; and
handing off the one or more users to an additional vehicle that flies over a different region of the environment and captures the experience of the different region of the environment for the one or more users of the user interactive devices.

17. A method for immersive interactive telepresence implemented at a user interactive device, the method comprising:
communicating a user preference to virtually experience an environment that is remote from a user of the user interactive device;
receiving audio and video of an experience captured in the environment in which a vehicle travels a route based on obstacle avoidance and user travel intent as determined from the user preference, the vehicle including a camera system that captures the video as a wide angle view of the environment; and
representing the experience of the environment for the user with the user interactive device, the experience including displaying a portion of the environment based on where the user is looking within the wide angle view of the environment, wherein the environment is virtually represented, at the user interactive device, based on a view point or a head position of a user.

18. The method as recited in claim 17, wherein:
the experience of the environment is a virtual tour represented with the user interactive device for the user; and
the vehicle is a virtual tourist guide being routed in the environment effective to facilitate the virtual tour, the vehicle configured to alter the route in the environment based on the determined user travel intent.

19. The system of claim 1, wherein the first interface and the second interface reside within a wireless network communication interface.

* * * * *